W. KENSTOWICZ.
TARGET.
APPLICATION FILED NOV. 6, 1915.

1,169,966.

Patented Feb. 1, 1916.
2 SHEETS—SHEET 1.

Waclaw Kenstowicz
INVENTOR.
BY
ATTORNEYS.

W. KENSTOWICZ.
TARGET.
APPLICATION FILED NOV. 6, 1915.

1,169,966.

Patented Feb. 1, 1916.
2 SHEETS—SHEET 2.

Waclaw Kenstowicz
INVENTOR.

BY
ATTORNEYS.

UNITED STATES PATENT OFFICE.

WACLAW KENSTOWICZ, OF CHICAGO, ILLINOIS.

TARGET.

1,169,966.  Specification of Letters Patent.  Patented Feb. 1, 1916.

Application filed November 6, 1915. Serial No. 59,975.

*To all whom it may concern:*

Be it known that I, WACLAW KENSTOWICZ, a citizen of the United States, residing at Chicago, in the county of Cook and State of Illinois, have invented certain new and useful Improvements in Targets, of which the following is a specification.

The device which is the subject-matter of the present application for patent is designed for use by baseball pitchers for the purpose of practising different kinds of deliveries.

This application is a continuation in part of the application Serial No. 33,502, filed June 11, 1915.

The invention has for its object to provide a simple and highly efficient device of the character stated, and in order that the same may be better understood, reference is had to the accompanying drawing in which—

Figure 1:
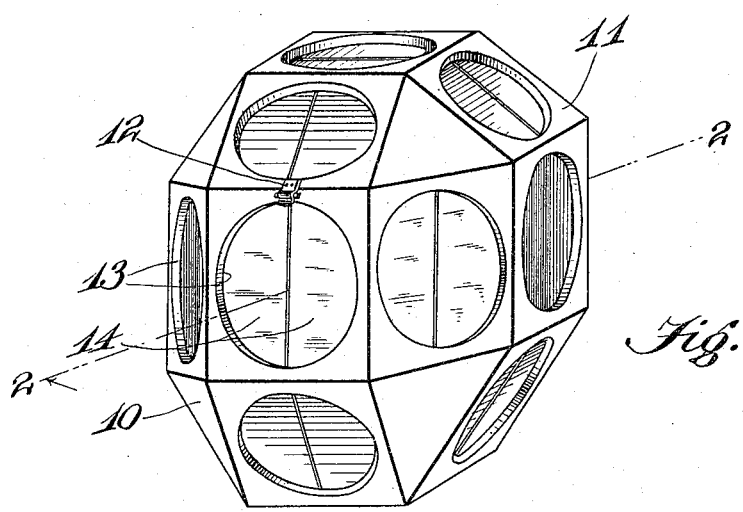
Figure 2:
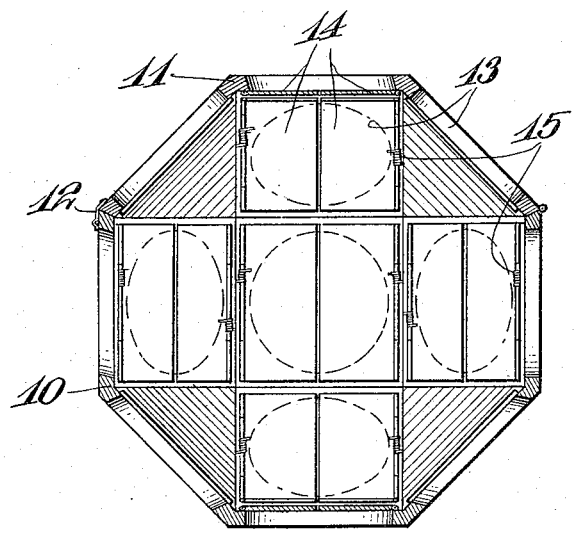
Figure 3:
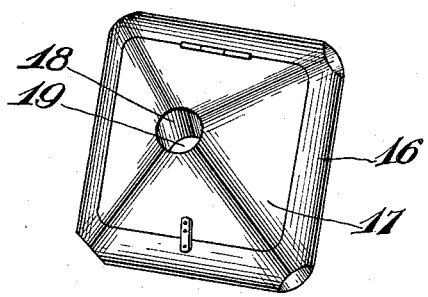
Figure 4:
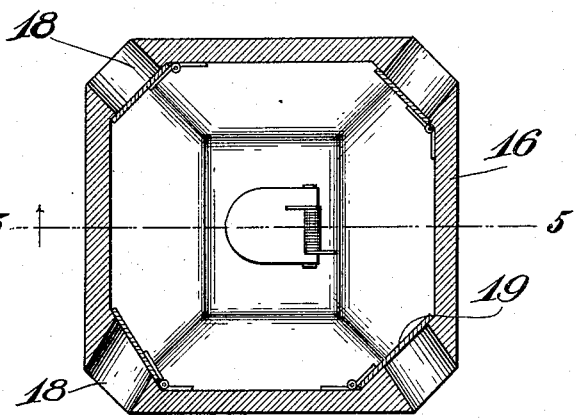
Figure 5:
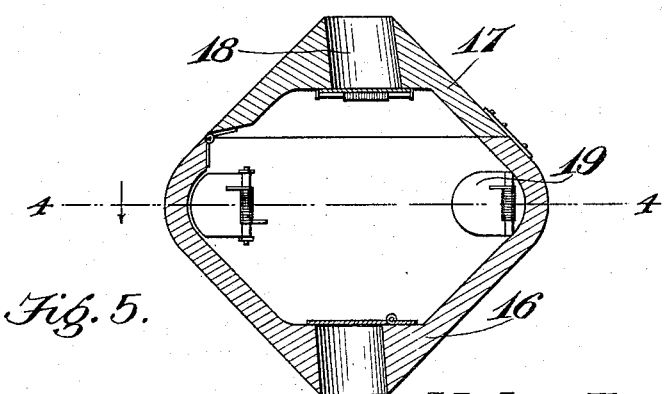

Figure 1 is a perspective view of the device; Fig. 2 is a cross section on the line 2—2 of Fig. 1; Fig. 3 is a perspective view of a modification; Fig. 4 is a vertical section on the line 4—4 of Fig. 5, and Fig. 5 is a horizontal section on the line 5—5 of Fig. 4.

Referring specifically to the drawings, the device comprises a receptacle 10 of polyhedral contour so that it may roll along the ground. The faces of the receptacle provide a supporting base for the same when at rest, and any one of the faces may serve as the supporting base. The receptacle has a hinged lid 11 so that access to the interior may be had, and the lid is a part of the receptacle so that its regular polyhedral contour is not destroyed. A suitable catch 12 is provided for holding the lid closed.

The device shown in Figs. 1 and 2 has twenty-six faces, eight of which are triangular and the remaining square. In each one of the square faces is an aperture 13 leading to and opening into the inside of the receptacle. At the inner end of each aperture is a closure comprising two opposite swinging gates 14 which are held normally closed by a spring 15. An ordinary spring hinge may be provided.

In use, the receptacle is placed on the ground and supported by resting on one of its faces. The player, standing some distance from the receptacle, then throws a ball at the same, the object being to have the ball enter the receptacle through one of the apertures 13. The gates 14 prevent the ball from rolling back out of any of the apertures if the player succeeds in getting a ball into the receptacle. If the ball hits the outside of the receptacle, the latter rolls over and comes to rest again on one of its faces. Some of the apertures will be arranged obliquely so that the ball will have to be skilfully manipulated to enter the same, and by properly slanting the apertures, the player can set the device in a position to receive a ball thrown in various ways, such as a high curve, a low curve, a left curve, straight, etc. This affords good practice for the different kinds of deliveries required by a baseball pitcher, and the device therefore serves well as a target for baseball pitching practice.

The receptacle has a sufficiently great number of sides and apertures to insure one of the apertures always being turned toward the user of the device, even if it is rolled over by the impact of the ball. There is also presented to the player, at all times, an aperture which is not parallel to the ground, but inclined or upwardly presented. It would be extremely difficult, if not impossible, to throw a ball into a horizontal aperture, as the ball would have to be thrown close to the ground and parallel thereto. However, if the aperture is upwardly presented, the natural drop of the ball at the end of its flight will carry it into the aperture if correctly aimed.

Figs. 3 to 5 show a modification, the receptacle 16 being octahedral, or having the shape of two quadrangular pyramids joined at their bases, and rounded thereat. The receptacle also has a hinged lid 17, and apertures 18 provided with gates 19, the apertures, however, being at the corners of the receptacle.

I claim:

1. A target for aerial projectiles, comprising a receptacle having a polyhedral contour of more than six faces, and provided with entrance apertures.

2. A target for aerial projectiles, comprising a receptacle having a polyhedral contour of more than six faces, and provided with entrance apertures opening into the receptacle obliquely.

3. A target for aerial projectiles, comprising a receptacle having the contour of two quadrangular pyramids joined at their bases and rounded thereat, said receptacle having entrance apertures at its corners.

4. A target for aerial projectiles, comprising a receptacle having the contour of two quadrangular pyramids joined at their bases, said receptacle having entrance apertures at its corners.

In testimony whereof I affix my signature.

WACLAW KENSTOWICZ.

Copies of this patent may be obtained for five cents each, by addressing the "Commissioner of Patents, Washington, D. C."